Figure 1:
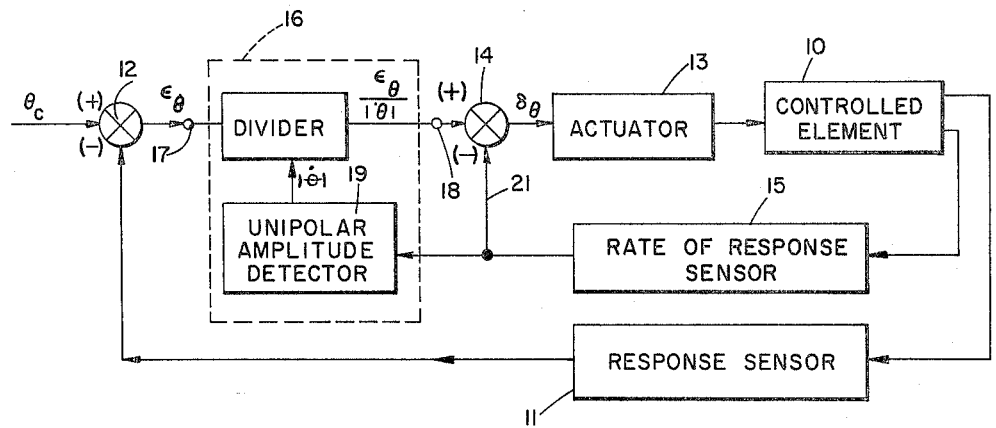

March 15, 1966  T. B. ALBRIGHT  3,241,027
AEROSPACE VEHICLE ATTITUDE CONTROL SYSTEM
Filed Sept. 27, 1962  2 Sheets-Sheet 1

INVENTOR.
THOMAS B. ALBRIGHT
BY
ATTORNEY

March 15, 1966     T. B. ALBRIGHT     3,241,027
AEROSPACE VEHICLE ATTITUDE CONTROL SYSTEM
Filed Sept. 27, 1962     2 Sheets-Sheet 2

INVENTOR.
THOMAS B. ALBRIGHT
BY
ATTORNEY

United States Patent Office 3,241,027
Patented Mar. 15, 1966

---

3,241,027
AEROSPACE VEHICLE ATTITUDE CONTROL
SYSTEM
Thomas B. Albright, Santa Ana, Calif., assignor to
North American Aviation, Inc.
Filed Sept. 27, 1962, Ser. No. 226,538
4 Claims. (Cl. 318—489)

This invention relates to an improved closed-loop control device, and more particularly to a non-linear control system having dynamic gain compensating means for providing an optimum system response.

In the closed loop control of a process or vehicle or other element to be controlled, improved damping in the system response has been sought by providing a feedback signal indicative of the rate or velocity, of response of the controlled element, in addition to providing an error signal indicative of the difference between the actual response and a desired response or reference. In the absence of a significant error signal, the rate signal serves to decrease or null the system rate of response, and hence damps or reduces system response, whereby minimum system error is maintained. When a large system error occurs, the actuation of the system in response to the error signal produces a system response which tends to reduce the system error. In such a rate-damped feedback system, the sense of the feedback signal indicative of the rate or speed of such response tends to oppose the initial response of the system to the error signal to reduce "overshoots." The magnitude of this initial response rate is a characteristic of the dynamics of the particular controlled element. However, for a given set of dynamics, a rate-damped system having fixed gains can be made to operate satisfactorily. In other words, adequate damped speeds of response can be obtained.

Where the vehicle sought to be controlled is one whose dynamics vary widely as a function of time or of environment, then a set of fixed gains for the error signal and the rate-damping signal may not be suitable to provide both adequate speeds of response and adaquate damping. For example, in the control of an aircraft, the flight performance of which extends over a wide range of combinations of speeds and altitudes, the natural damping and gain (or speed of response) of the aircraft will vary widely. For example, in low altitude, high speed flight, the aircraft will demonstrate high speeds of response and maximum damping. Therefore, nominal controller gains and little or no rate feedback are required. However, at high altitudes, the aircraft will display a slower speed of response, and little natural damping, due to the decreased density of the atmosphere at such higher altitudes. Accordingly, a high controller gain in conjunction with a high rate feedback signal gain are required to achieve improved speeds of response with adequate damping. Hence, the requirements for the controller used for the closed loop control of such vehicle vary as a function of environment (e.g., vehicle speed and altitude) in order to provide a suitable, or preferably fixed, dynamic response.

The reason for desiring a somewhat fixed dynamic response of the system is to reduce the extent of pilot skill and operator training required to successfully utilize and control the system.

In the prior art, environment-responsive devices have been employed to schedule or adjust the response of the controller in an open-loop fashion, in order to compensate for the change in the response characteristics or dynamics of the controlled vehicle. Such open-loop techniques, for example, controlled the gain of the controller as a function of sensed air speed and/or barometric altitude, rather than as a direct function of the system dynamic response. However, the range of environment variations over which such devices can be designed to effect such compensation is limited. Other approaches to the design of controllers for vehicles having environment-dependent dynamics have been the use of so-called adaptive systems, in which the controller measures several aspects of the vehicle response, compares them with sets of criterion, and computes a change in the controller gain or dynamics or both. Such devices are complex, and of limited effect. Such an adaptive system has a slow speed of response in order not to interfere with the dynamics of the control loop, the device changing the steady-state gain and dynamics of the controller at a limited rate. Further, such adaptive systems do not include criterion as to variations in initial conditions under which the system transient is induced.

Further, the devices employing such self-adaptive features of the prior art rely upon high response, high-torque actuation systems the performance of which do not employ minimum expenditure of energy. Such minimum expenditure of energy for control is significant in space vehicles, wherein the limited fuel and energy must be efficiently employed to assure the desired completion of long-range controlled trajectories.

The concept of the subject invention provides optimum speed of response under widely varying conditions of vehicle dynamics, while providing good damping of the system transient response and requiring minimum control energy for achieving vehicle control, consistent with the desired speed of response.

In a preferred embodiment of the subject invention, there is provided a rate-damped negative feedback control system having means for generating a system error signal indicative of the difference between the system response and a reference. There is also provided signal means for generating a signal indicative of the amplitude of the rate of the system response. Signal divider means is responsively connected to the error signal means and the signal means for providing a control signal indicative of the ratio of system error divided by the rate of system response. There is further provided signal utilizing means for applying the control signal to the rate-damped control system for control of the system response.

By means of the above described arrangement, large dynamic control signals are provided when the initial transients of the controlled element indicate inadequate response (as shown, for example, by the low rate of response signal). As the controlled element of the system responds (indicated by the increased amplitude of the rate of response signal), the control signal gain is reduced by the action of the signal divider, whereby the rate-damping aspect of the rate-damped system operates to prevent or reduces overshoot transients in the system response. By means of continuously programming the controller gain as a function of the system dynamics, an optimum system response is achieved over a wide range of variations in the vehicle dynamic response, without regard to the initial conditions under which such dynamic response is induced.

Accordingly, it is a broad object of the invention to provide self-adaptive means for dynamically varying the gain of a control system.

It is another object of the invention to provide means for dynamically varying the gain of a control system as a function of the transient response thereof.

It is still another object of the invention to provide means for optimizing the damped speed of response of a control system including a controlled element having a wide range of static and dynamic response characteristics.

It is a further object of the invention to provide substantially fixed response characteristics for a control system including a controlled element having a wide range of response characteristics.

It is yet a further object of the invention to provide an adaptive control system for a controlled element of variable dynamics, which requires minimum operator skill and training to operate.

Figure 2A:
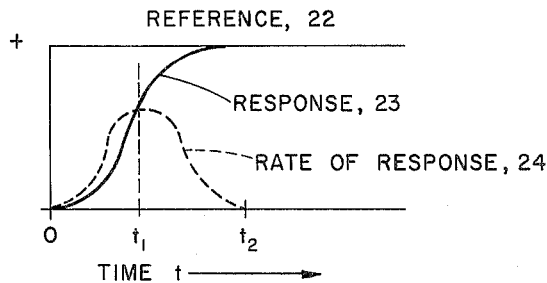
Figure 2B:
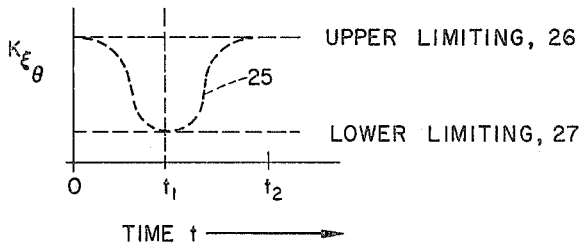
Figure 2C:
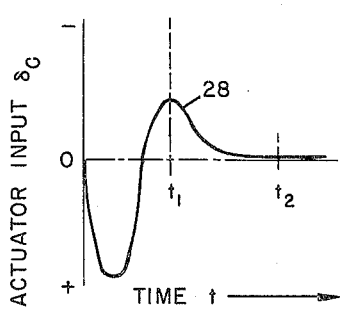
Figure 3:
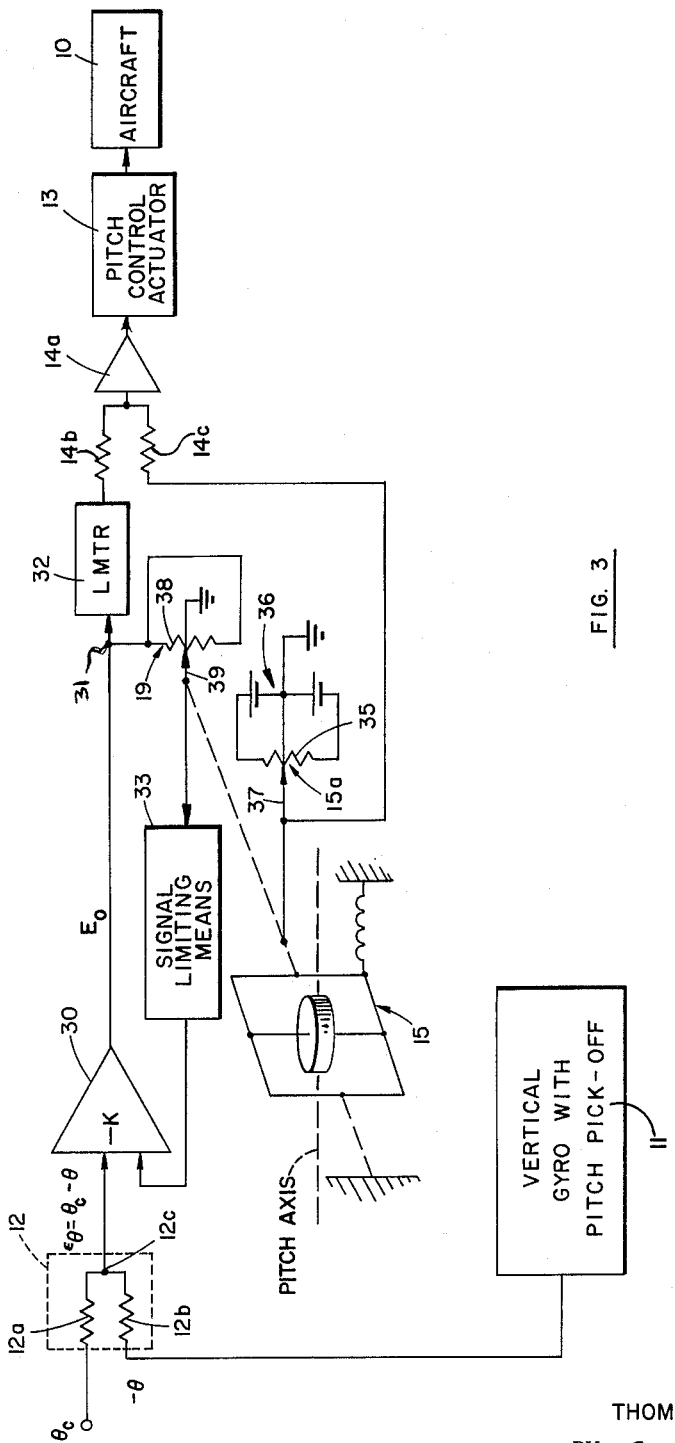

These and other objects of the invention will become apparent from the following description, when taken together with the accompanying figures in which:

FIG 1. is a functional block diagram of a system employing a concept of the invention;

FIG. 2 is a series of representative time histories of the response of the device of FIG. 1 to a step input; and FIG. 3 is a preferred embodiment of the device of FIG. 1 illustrating an analog pitch controller for an aircraft flight control system.

Referring to FIG. 1 there is illustrated a functional block diagram of a system employing a concept of the invention. There is provided a rate-damped negative feedback control system comprising a controlled element 10, means 11 for sensing the response of controlled element 10, means 12 for generating a system error signal indicative of the difference between the system response and a reference. Signal utilizing means or an actuator 13 is responsively connected to system error signal means 12 for controlling the controlled element 10 so as to reduce the system error signal toward zero. Signal summing means 14 is interposed at the input to actuator 13 and is also responsively connected by line 21 to means 15 for sensing the rate of response of controlled element 10, whereby a rate-damping signal is combined with the system error signal input to actuator 13.

Interposed between signal summing means 14 and the output of signal comparing means 12 is gain adjusting means 16 responsively connected to rate sensor 15 for increasing the gain of the system error signal in the absence of a system rate of response and reducing such gain as a function of the rate of response of controlled element 10. Gain adjusting means 16 is comprised of an input terminal 17 connected to comparator 12, an output terminal 18 connected to summing means 14, and a unipolar amplitude detector 19 responsively connected to rate sensor 15 for providing a signal of fixed sense and having an amplitude indicative of the amplitude of the rate of response of controlled element 10. There is also provided a signal divider 20 responsively connected to input terminal 17 and the output from detector 19 for providing an output signal on output terminal 18 which is indicative of the ratio of the system error divided by the amplitude of the system rate of response.

The actual construction and design of detector 19 would include signal limiting means for limiting both the maximum and minimum allowable signals from detector 19, for reasons which will be explained hereinafter in connection with a description of the operation of the device of FIG. 1.

The normal operation of the device of FIG. 1 may better be appreciated from the time histories shown in FIGS. 2a, 2b, and 2c.

Referring to FIGS. 2a, 2b, and 2c, there are illustrated representative time histories of the response of various elements of FIG. 1 to a step input applied as a reference to comparator 12. In FIG. 2a, curves 22, 23 and 24 illustrate respectively the step input to the system, the response of controlled element 10 (of FIG. 1) to such input, and the associated rate of response of controlled element 10. It is observed that the rate of response (curve 24) of element 10 increases in such a sense as to indicate the actuation of element 10 (curve 23) toward the reference 22, and then the rate of response 24 decreases to zero as the response 23 approaches the reference.

In FIG. 2b, curve 25 illustrates the time history of the variable gain of the system error signal, provided by gain adjusting means 16 of FIG. 1, in response to the rate transient (curve 24) of FIG. 2a, while curves 26 and 27 illustrate the effect of limiting the output of detector 19 (of FIG. 1). It is observed that the gain (curve 25) of the system error signal (e.g., the signal level for a given system error) is very high when the rate of response (curve 24 in FIG. 2a) of element 10 is very low, and that such gain is a minimum when the rate of response is a maximum. Each response of the system gain is due to the action of divider 20 (of FIG. 1) in controlling the gain of the system error signal as an inverse function of the amplitude of the system response rate. Several purposes of such control of gain as an inverse function of the rate feedback signal are (1) to minimize steady-state system errors (e.g., residual errors after subsidence of system transients) and (2) to increase initial transient response of the system controller to transient system errors. However, a perfect or ideal divider would provide an infinitely large system gain for near-zero rate signals, which could result in overdriving, or saturating of the control elements, or could conceivably result in system instability or unstable response for systems having limited gain margins (i.e., gain limits above which the system is unstable). Accordingly, limiting of the minimum allowable signal level from detector 19 (in FIG. 1) provides a maximum allowable limit of the gain which is an inverse function of the rate signal, and hence is preferred or desirable in order to limit the maximum system error gain.

Another purpose of controlling the gain as an inverse function of the rate signal is to reduce minimum system response to system error signals during transient periods of high transient rates of response, whereby the rate-damping loop (provided by the feedback from rate sensor 15 on line 21 in FIG. 1) may damp the system response in order to prevent transient overshoots of the system response, relative to a reference input. However, divider 20 (of FIG. 1) could thus provide such a low system error gain in conjunction with high transient rates of response, that over-damping of the system might result. In other words, the response of the system to a system error would be sluggish or too slow. Accordingly, limiting of the maximum allowable signal from detector 19 (of FIG. 1) provides a minimum allowable gain as an inverse function of the rate signal, and hence is preferred in order to limit the minimum system error gain.

In FIG. 2c, curve 28 illustrates the time history of the input to actuator 13 (of FIG. 1) from summing means 14. For an actuator having ideal dynamic properties (e.g., no dynamic response time), curve 26 would also represent the response of actuator 13 as an input to controlled element 10. It is observed that a large initial actuator response is called for, of such a sense as to induce the controlled element to rapidly respond to the reference input (curve 22 of FIG. 2a). Such large initial actuator response is due to both the large initial system error (e.g., large difference between the system response and the reference input in FIG. 2a), and the large initial system error gain (curve 25 in FIG. 2b). As the system error decreases (curve 23 approaches curve 22 at $t_1$ in FIG. 2a) and as the system error gain decreases (curve 25 at $t_1$ in FIG. 2b), the system error signal on terminal 18 in FIG. 1 approaches a minimum, while the system response rate damping signal on line 21 in FIG. 1 approaches a maximum, corresponding to the system rate of response curve 24 in FIG. 2a. Hence, the rate damping signal exceeds the system error signal at summing means 14, in FIG. 1, causing a reversal of the sense of the output from summing means 14 (curve 28 at $t_1$ in FIG. 2c).

Such control signal transient at $t_1$ serves to decelerate or damp the system whereby transient overshoots of the system response are reduced or avoided. Hence, as the system response is damped, the actuator input signal 28 decays (e.g., curve 28 at $t_2$ in FIG. 2c) to a steady state value dictated by the steady state error characteristic of the system.

Accordingly, it is to be understood that the system of FIG. 1 provides optimum transient response with good damping by means which cooperate as a function of the transient response of the controlled element. Therefore, it is to be understood that the utility of the invention is not limited by the dynamics of the controlled element or of the style of input to the system. Instead, the device of the invention employs or dynamically cooperates with the transient response rate of the controlled element to provide improved system response. Hence, the invention is useful for automatically adapting a closed-loop control system to a controlled element whose dynamic response characteristics are subject to variation or change.

Because the device of the invention is intended to cooperate with the transient response of a controlled element, the speed of response of divider 20 in FIG. 1 must be essentially a high speed device, having a transient speed of response many times faster than the speed of response of controlled element 10. A preferred mechanization of such device in an exemplary application of the invention is shown in FIG. 3.

Referring to FIG. 3, there is illustrated a preferred embodiment of the device of FIG. 1 as applied to an analog attitude controller of a vehicle control system. There is provided first sensing means 11 for providing a signal indicative of the attitude response of an aircraft 10, a second sensing means 15 for providing a damping signal indicative of the rate of change of the attitude response, and comparison means 12 responsive to a signal reference $\theta_c$ and the attitude response signal from sensor 11 for providing an attitude-error signal $\epsilon_\theta$ indicative of the difference between a reference input signal, $\theta_c$, and such attitude response signal, $\theta$. In the exemplary aircraft pitch control system of FIG. 3, first and second sensors 11 and 15 would comprise, respectively, a vertical gyro with a pitch angle pickoff, and a rate gyro oriented to detect pitching rate, the construction of which devices is well-known in the art. Accordingly, elements 11 and 15 are shown in a simplified schematic form only.

By reversing the sense of the output signal from vertical gyro 11, relative to the sense or polarity of the attitude response signal sensed, a summing network may be employed for comparison means 12. Such summing network is comprised of a first and second summing resistor 12a and 12b, each having two terminals, a first terminal of which is commonly connected to a summing point 12c. The second terminal of resistor 12a is adapted to be connected to a source $\theta_c$ of a reference attitude signal, and the second terminal of resistor 12b is connected to the output of vertical gyro 11.

Control means responsive to the attitude error signal and an attitude rate damping signal is provided for controlling the pitch attitude of the aircraft 10 in such a sense as to tend to reduce the system attitude error to zero. Such control means includes a pitch control actuator 13 in cooperation with the pitching controls of the aircraft and responsively connected to a summing amplifier 14a.

The construction and arrangement of actuator 13 and amplifier 14a are well-known to those skilled in the art; therefore, these elements are shown in block form only.

The input to amplifier 14a is responsively connected to output terminal 12c (e.g., a source of the system attitude error signal) by means of a summing resistor 14b, and further connected to a rate gyro pickoff potentiometer 15b of rate gyro 15 by means of a summing resistor 14c. The rate damping pickoff means 15a of rate gyro 15 is constructed and arranged to provide a signal indicative of both the sense and magnitude of the angular rate sensed. Such pickoff may be constructed for example of a potentiometer having a resistive element 35 connected across a D.-C. source 36 of constant potential, elements 35 and 36 being centertapped and the centertaps interconnected; and a wiper arm in mechanical cooperation with rate gyro for movement in response to a sensed angular rate. Hence, the displacement of the wiper arm 37 of potentiometer 15a along the resistive element 35 of potentiometer 15a relative to the centertap provides a potential difference relative to the centertap which has a sense and magnitude indicative of the sense and magnitude of the angular rate sensed by sensor 15. The sense of the rate gyro signal from pickoff 15a is selected to provide a rate-damping signal, whereby the control means seeks to control the aircraft so as to tend to reduce the sensed pitching rate to zero.

There is further provided dynamic gain adjusting means interposed between system error signal terminal 12c and summing resistor 14b for continuously adjusting the gain of the control system in FIG. 3 as a function of the transient response of the system. Such adjusting means includes amplitude detection means or potentiometer pickoff means 19 mounted on rate gyro 15, having a centertapped resistive element 38 and a wiper arm 39 in cooperation with rate gyro 15 in a manner similar to that of the wiper arm of potentiometer 15a.

The gain adjusting means also includes a phase-inverting, high-gain summing amplifier 30 interposed between terminal 12c and the input to summing resistor 14b, a first input of amplifier 30 being connected in circuit to terminal 12c and the output of amplifier 30 being fed to summing resistor 14b in phase opposition or of a sense opposite that of such first input. A second input of amplifier 30 is responsively connected across the wiper arm and the centertap ground terminal of potentiometer 19. The output of amplifier 30 is also connected across the centertap ground terminal of potentiometer 19 and a common terminal 31, the first and second end terminals of the resistive element of potentiometer 19 being commonly connected to common terminal 31.

In normal operation of the device of FIG. 3, elements 30, 15, and 19 cooperate in a manner to effect the function of gain-adjusting means 16 in FIG. 1, the feedback arrangement of amplifier 30 serving as divider 20, and potentiometer 19 serving as a unipolar amplitude rate detector. Because the first and second terminals of the centertapped resistive element of potentiometer 19 are commonly connected, it is to be appreciated that the sense of the output signal on the wiper of potentiometer 19 is unaffected by the sense of the angular rate detected by sensor 15, but is determined only by the sense of the excitation applied by the output of phase-inverting amplifier 30. Further, because amplifier 30 is a phase-inverting amplifier, it is to be appreciated that the sense of the signal fed from potentiometer 19 to the second input of amplifier 30 is always opposed to the sense of the first input to amplifier 30. Hence, amplifier 30 is arranged in a negative feedback arrangement.

That elements 30, 15 and 19 function in the manner of an analog signal is to be more easily seen from the following analytical treatment.

It is well known that the output signal of a potentiometer is a function of the applied excitation, and is proportional to the wiper arm displacement. Further, it is recalled that the wiper arm displacement of potentiometer 19 is determined by the angular rate $\theta$ sensed by pitch rate gyro 15. Accordingly, the output $e_2$ from potentiometer 19 may be written as follows:

$$e_2 = |K_2 \theta| E_o \qquad (1)$$

where:

$E_o$ is the excitation provided by output signal from amplifier 30;

$| \ |$ notation indicates that $e_2$ is a function of the amplitude only, and not the sense of the angular rate, $\theta$; and $K_2$ is a constant of proportionality determined by a specific rate gyro design.

In other words, Equation 1 indicates that the output of potentiometer 19 has a magnitude indicative of the product of the magnitudes of the sensed angular rate and the applied excitation, and a sense which varies only as the sense of $E_o$ varies. The combined input $e_1$ to amplifier 30 is written as the sum of the first and second inputs:

$$e_1 = \epsilon_\theta + e_2 \qquad (2)$$

$$e_1 = \epsilon_\theta + K_2|\theta|E_o \qquad (3)$$

Such sum, however, represents a difference signal in that the sense of $e_2$ is determined by the sense of $E_o$ and the sense of $E_o$ is always opposed to that of $\epsilon_\theta$, due to the phase-inverting characteristics of amplifier 30.

The relationship of the output $E_o$ of amplifier 30 to the input $e_1$ thereof is related to the input by the gain, $-K_1$, of amplifier 30, where the minus sign ($-$) indicates the phase-inversion property of amplifier 30:

$$E_o = -K_1 e_1 \qquad (4)$$

Substituting Equation 3 in Equation 4:

$$E_o = -K_1(\epsilon_\theta + K_2|\theta|E_o) \qquad (5)$$

$$E_o(1 + K_1 K_2|\theta|) = -K_1\epsilon_\theta \qquad (6)$$

Solving for the gain term or transfer function, $E_o/\epsilon_\theta$:

$$\frac{E_o}{\epsilon_\theta} = \frac{-K_1}{1 + K_1 K_2|\theta|} \qquad (7)$$

$$\frac{E_o}{\epsilon_\theta} \approx \frac{K}{|\theta|} \qquad (8)$$

where:

$K_1 K_2|\theta| \gg 1$ and $$K = \frac{1}{K_2}$$

Referring again to FIG. 3, there is provided signal limiting for reasons which were explained in connection with FIG. 2b and which are more fully explained hereinafter.

In the operation of the arrangement illustrated in FIG. 3 as a signal divider, the signal representing the quotient $$\frac{\epsilon_\theta}{|\theta|}$$

would approach an infinitely large value as the rate signal $\dot{\theta}$, indicative of pitch rate, approached zero or a null, thereby producing hard-over control signals or control system saturation in response to small pitch attitude errors, $\epsilon_\theta$. Therefore, a signal limiter 32 is preferably employed at the input to summing resistor 14b, in order to limit the system error signal input to summing amplifier 14a. In this way, such hard-over signal inputs are avoided. Further, in the presence of high rates of response, the system error signal representing the quotient $$\frac{\epsilon_\theta}{|\theta|}$$

may be reduced to the extent that the positional control loop would become ineffective. Therefore, a signal limiter 32 is preferably employed at the output of potentiometer (reference numeral) 19 to limit the maximum $\dot{\theta}$ signal therefrom, and thereby limit the attenuation of the signal ratio, $$\frac{\epsilon_\theta}{|\theta|}$$

Limiters 32 and 33, being functionally similar, are similarly constructed and arranged in a manner well-known in the art for providing bi-polar limiting of a maximum signal amplitude, and are therefore shown in block form only. Such signal limiters may be comprised, for example, of diode circuits of a type illustrated in FIG. 6.23f on page 292 of Electronic Analog Computers by Korn and Korn, second edition (McGraw-Hill, 1956).

It is to be further appreciated that the device of FIG. 3, as applied to the attitude control system of a flexible vehicle, tends to reduce the response of the system to bending modes of such flexible vehicle which may be detected by the control system sensors. Such control system characteristic is significant in that the dynamic coupling of the bending dynamics of the vehicle with the control system dynamics by means of the control system sensors mounted on the vehicle might otherwise cause control system instability. Such instability could result in loss of vehicle control, and in structural failure of the vehicle due to excitation of the bending modes.

Where the frequency of a given bending mode is substantially beyond, or higher than, the frequency response of the system, such coupling of the bending mode is not serious, particularly where the bending mode frequency is greater than the natural frequency of the rate gyro 15. Under such circumstances, the effect of the bending mode upon the control system is greatly attenuated, and the bending mode and control dynamics are said to be decoupled. However, where the natural frequency of vibration of the bending mode lies within the frequency response of the sensors, such as rate gyro 15, and particularly where such bending mode frequency lies within the frequency response of the controlled vehicle dynamics, then a flight control sensor located in the vehicle so as to unavoidably detect such bending motion is said to couple the bending mode and control system dynamics. By means of the subject invention, however, such coupling tends to be attenuated or reduced in effect.

Considering the bending mode to be adequately described as a sinusoidal function, and ignoring the static command signal, the dynamic component of the system error signal, $\epsilon_\theta = \theta_c - \theta$, is contributed by the attitude feedback signal, $-\theta$. Considering that component of the attitude feedback signal due to the bending mode detected by the vertical gyro 11:

$$\epsilon_\theta = -|\theta|_{bend} \sin W_B t \qquad (9)$$

where $|\theta|_{bend}$ is the amplitude of the bending mode, and $W_B$ is the frequency thereof. Similarly, considering that component of the pitch rate feedback signal on resistor 14c due to the bending mode detected by rate gyro 15:

$$\dot{\theta}_{bend}(t) = \frac{d(\theta_{bend})}{dt} = W_B|\theta|_{bend} \cos W_B t \qquad (10)$$

Substituting Equation 9 into Equation 10 and rearranging $$\dot{\theta}_{bend} = -W_B \theta_{bend} e^{j90°} \qquad (11)$$

Hence, the dynamic rate signal component occurring due to the bending mode is seen to lead the corresponding position signal component by 90°. In other words, the position signal lags the rate signal by 90°. Now, the division of the position error signal by the rate signal, occurring due to the action of the divider of the invention, provides a further 90° lag to the position error signal:

$$\frac{\epsilon_\theta}{|\dot{\theta}|e^{j90°}} = K\epsilon_\theta^{-j90°} \qquad (12)$$

Hence, it is seen that the position error signal component occurring at summing resistor 14b due to the bending mode is 180° out of phase with the rate feedback signal component occurring at summing resistor 14c due to the bending mode. Therefore, it is to be appreciated these two bending mode signal components tend to cancel each other, as to attenuate the effect of a vehicle bending mode.

The system dynamic response characteristics or tendencies toward a constant dynamic response over a wide range of vehicle gains, and toward bending mode decoupling indicate a degree of dynamic self-adaptation for control systems employing the concept of the invention. Further, the characteristic transient increase in position gain corresponding to low rates of response tends to reduce the design requirements upon control torque actuation equipment (e.g., actuator 13 in FIG. 1) and system sensors.

Hence, it is to be appreciated that the subject invention provides dynamic means for improving the performance of a rate-damped control system by dividing the system error gain by the amplitude of the rate signal. The invention has been illustrated by means of an analog device; however, such embodiment is exemplary only, the concept of the invention being equally adapted to employing equivalent digital means. For example, in a complex missile guidance system, employing digital data and a so-called general purpose digital computer, additional computer programming may be provided by means well-known in the art for effecting the computation of the signal ratio $$\frac{\epsilon_\theta}{|\dot\theta|}$$

and for providing upper and lower limiting of such ratio. Further, the application of the invention is not limited to closed-loop vehicle attitude control, but may be applied to open-loop controllers, and to other control processes such as trajectory control, for example.

Although the invention has been described and illustrated in detail, it is to be clearly understood that the same is by way of illustration and example only and is not to be taken by way of limitation, the spirit and scope of this invention being limited only by the terms of the appended claims.

I claim:

1. A feedback control system for controlling the attitude of a controlled vehicle comprising first sensing means for providing a first signal indicative of said attitude; second sensing means for providing a damping signal indicative of the rate of said attitude; comparison means responsive to said first signal and a reference signal for providing an attitude error signal indicative of the difference therebetween; control means responsive to said attitude error signal and said damping signal for controlling said attitude; and gain adjusting means responsively connected to said second sensing means for adjusting the gain of said control system as a function of said damping signal, said gain adjusting means comprising amplitude detection means in cooperation with said second sensing means for providing a signal indicative of the magnitude of said attitude rate and having a sense determined by the sense of an electrical excitation applied to said detection means, a phase-inverting high-gain summing amplifier having a first input responsively connected to said comparison means and a second input responsively connected to the output of said amplitude detection means, the output of said phase inverting amplifier being connected in electrical circuit to excite said amplitude detection means, whereby the sense of said first and second inputs to said phase inverting amplifier are mutually opposed.

2. A feedback control system for controlling the attitude of a controlled vehicle comprising a vertical gyro for providing a first signal indicative of said attitude; a rate gyro for providing a damping signal indicative of the rate of said attitude; a first summing means responsive to said first signal and a reference for providing an attitude error signal indicative of the difference therebetween; control means including a second summing amplifier responsive to said attitude error signal and said damping signal for controlling said attitude; and gain adjusting means responsively connected to said second sensing means for adjusting the gain of said control system as a function of said damping signal, said gain adjusting means comprising amplitude detection means in cooperation with said rate gyro for providing a signal indicative of the magnitude of said attitude rate and having a sense determined by the sense of an electrical excitation applied to said detection means, and a phase-inverting high-gain summing amplifier having a first input responsively connected to said first summing amplifier and a second input responsively connected to the output of said amplitude detection means, the output of said phase inverting amplifier being connected in electrical circuit to excite said amplitude detection means, whereby the sense of said first and second inputs to said phase inverting amplifier are mutually opposed.

3. A feedback control system for controlling the attitude of a controlled vehicle comprising a vertical gyro for providing a first signal indicative of said attitude; a rate gyro for providing a damping signal indicative of the rate of said attitude; a first summing means responsive to said first signal and a reference for providing an attitude error signal indicative of the difference therebetween; control means including a second summing amplifier responsive to said attitude error signal and said damping signal for controlling said attitude; and gain adjusting means responsively connected to said second sensing means for adjusting the gain of said control system as a function of said damping signal, said gain adjusting means comprising potentiometer pick-off means mounted on said rate gyro, said pick-off means including a resistive element having first and second end terminals and a center tap terminal and a wiper arm in mechanical cooperation with said rate gyro for displacement of said wiper arm relative to said resistive element as a function of said attitude rate, and a phase-inverting high-gain summing amplifier having a first summing means and a second input responsively connected across the center tap terminal and wiper arm of said potentiometer and the output of said phase inverting amplifier being connected across said center tap terminal of said potentiometer and a common terminal, said first and second end terminals of said resistive element being commonly connected to said common terminal, whereby the sense of said first and second inputs to said phase inverting amplifier are mutually opposed.

4. The device of claim 3 in which there is further included first signal limiting means operatively connected for limiting the magnitude of the second input to said first summing means, and second signal limiting means for limiting the magnitude of the attitude error signal input to said summing amplifier.

References Cited by the Examiner

UNITED STATES PATENTS

| 2,466,035 | 4/1949 | McCoy | 318—30 |
| 2,593,950 | 4/1952 | Williams | 318—28 |
| 2,692,356 | 10/1954 | Milsom | 318—489 |
| 2,776,428 | 1/1957 | Hassler et al. | 318—489 |
| 2,801,059 | 7/1957 | Hecht et al. | 318—489 |
| 2,835,861 | 5/1958 | Eckhardt | 318—489 |
| 2,941,139 | 6/1960 | Marx | 318—448 |

JOHN F. COUCH, *Primary Examiner.*